June 23, 1959 F. J. FOSTER 2,891,466
ADJUSTABLE CAKE FRAME
Filed April 27, 1956
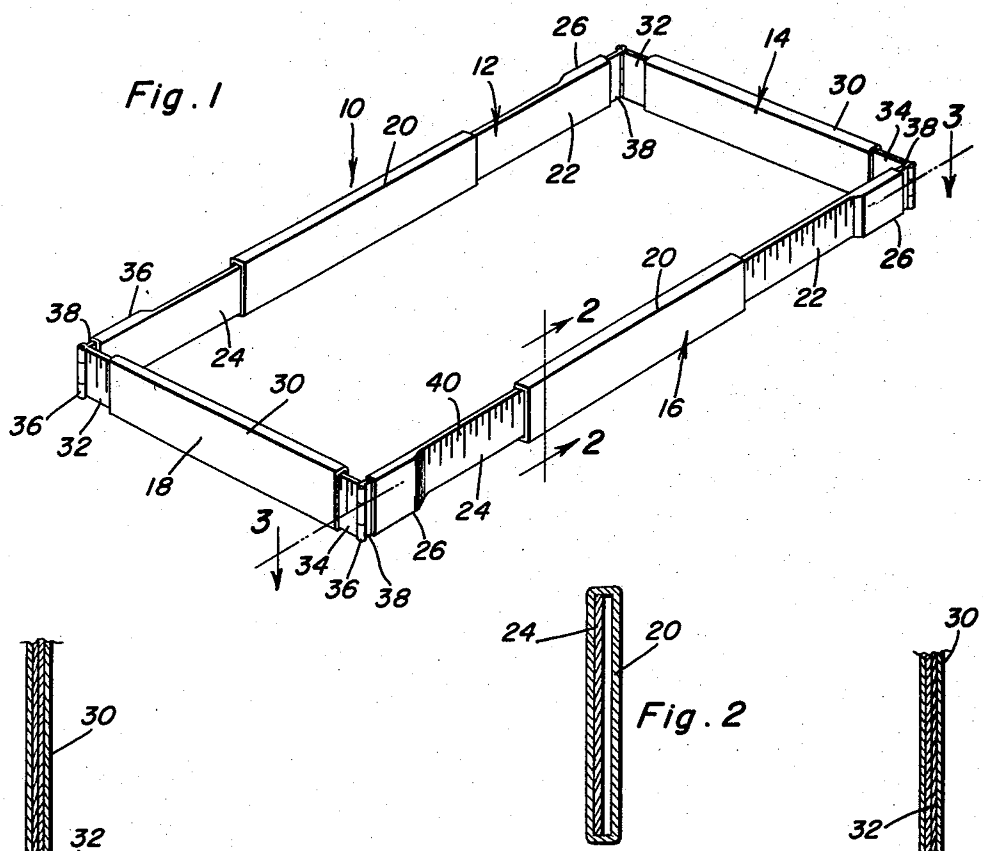
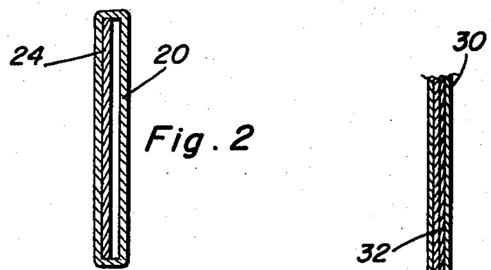
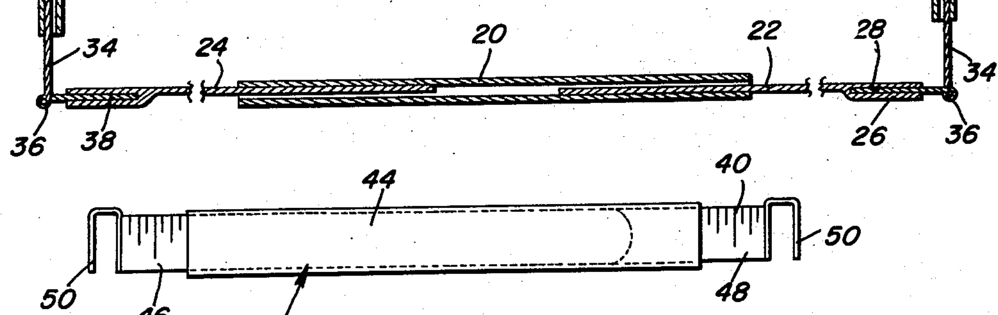
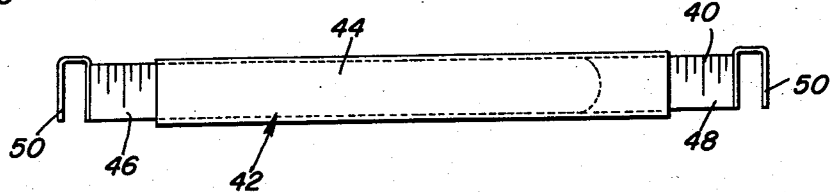
Frances Jane Foster
INVENTOR.
BY Clarence A. O'Brien and Harvey B. Jacobson, Attorneys United States Patent Office 2,891,466

Patented June 23, 1959

2,891,466

ADJUSTABLE CAKE FRAME

Frances Jane Foster, Dennisport, Mass., assignor of fifty percent to Frank G. Foster, Dennisport, Mass.

Application April 27, 1956, Serial No. 581,163

4 Claims. (Cl. 99—435)

This invention generally relates to a cooking utensil and more specifically provides a cake frame adapted to be positioned on the upper surface of a base member such as a cookie sheet for retaining cake dough in a desired shape during the baking thereof.

In the baking of cakes, it is frequently desirable to bake rectangular or square cakes of varying sizes for different purposes. In this connection, the present invention has its primary object in providing a cake frame which is adjustable in size for positioning on the upper surface of a cookie sheet for retaining the cake dough in a desired shape during the cooking thereof.

Another object of the present invention is to provide an adjustable cake frame having telescopically adjustable side walls with graduations thereon for determining the size of the cake which is being baked.

Another important object of the present invention is to provide an adjustable cake frame which may be easily disassembled after the cake has been baked to facilitate the removal of the cake and to eliminate the necessity for taking a cake out of the pan and also permitting the device to be stored in a relatively small space such as the silverware drawer.

Yet another object of the present invention is to provide an adjustable cake frame having a divider which may be optionally employed for baking a plurality of equal size cakes for the formation of a layer cake.

Other objects of the present invention will reside in its simplicity of construction ease of cleaning, ease of storing, adaptation for its particular purposes and its extremely inexpensive manufacturing cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the adjustable cake frame of the present invention;

Figure 2 is a transverse, vertical sectional view taken substantially upon a plane passing along section line 2—2 of Figure 1;

Figure 3 is a top sectional view taken substantially upon a plane passing along section line 3—3 of Figure 1 illustrating the details of construction of the adjustable side wall of the frame; and Figure 4 is an elevational view of a divider to be employed with the cake frame of the present invention.

Referring now specifically to the drawings, the numeral 10 generally designates the adjustable cake frame of the present invention which is specifically adapted for use with a base member having a flat upper surface upon which the cake frame 10 may be rested thereby forming an enclosure for retaining cake dough. An example of base member is an enlarged cookie sheet which is normally employed for cooking a plurality of cookies and, which is usually available to the average housewife.

The adjustable cake frame 10 of the present invention includes four side walls generally designated by the numerals 12, 14, 16 and 18 with the walls 12 and 16 being opposite and the walls 14 and 18 being opposite and identical in construction.

Each of the walls 12 and 16 includes a tubular central portion 20 and end portions 22 and 24 which are telescopically received within the tubular central portion 20 and slide past each other for permitting the end sections 22 and 24 to be substantially completely received within the central portion 20 which is substantially equal in length to the end portions 22 and 24. Each of the end portions 22 and 24 are provided with a slightly enlarged end 26 having a socket 28 therein wherein the enlarged end 26 will abut the end of the central portion 20 for limiting the movement of the end sections 22 and 24 inwardly into the tubular central portion 20.

Each of the other opposite walls 14 and 18 includes a central tubular portion 30 telescopically receiving end portions 32 and 34 with the outer ends of each of the end sections 32 and 34 including a hinge 36 to which is pivotally attached a projecting tab 38 for detachable sliding engagement with the sockets 28. The outer surfaces of the end portions 22 and 24 as well as the end portions 32 and 34 are provided with graduation indicia 40 with suitable numerical indicia (not shown) for designating the length of the side wall by using the tubular central portions 20 or 30 as a reference line.

Figure 4 illustrates a divider generally designated by the numeral 42 having a tubular central portion 44 and end portions 46 and 48 that is provided with a downwardly opening hook 50 for engagement over opposite ends walls 12 and 16 for dividing the area defined by the walls into equal sized areas for forming a layer cake. It will be understood that any size of cake frame may be provided wherein the walls thereof are adjustable for varying the size of the cake as desired and a wax paper liner may be employed for retaining the cake dough in position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An open cake frame for use in combination with a base member having a flat upper surface, said frame comprising four side walls joined at the ends thereof and resting on the base member thereby forming a retaining wall for cake dough, each of said side walls including a central portion and a pair of end portions, said central portion being tubular and telescopically receiving the end portions, the end portions of opposite of said side walls having remotely disposed outwardly facing sockets, and a projecting tab on each end of the other opposite side walls detachably engaged with said sockets to permit disassembly of the frame for easy removal of a baked cake.

2. A cake frame for use in combination with a base member having a flat upper surface, said frame comprising four side walls joined at the ends thereof and resting on the base member thereby forming a retaining wall for cake dough, each of said side walls including a central portion and a pair of end portions, said central portion being tubular and telescopically receiving the end portions, the end portions of opposite of said side walls having remotely disposed outwardly facing sockets, and a projecting tab on each end of the other opposite side walls detachably engaged with said sockets to permit disassembly of the frame for easy removal of a baked cake, and hinge means interconnecting said tabs and the other opposite walls to permit folding of the tabs alongside the adjacent wall for storage.

3. The combination of claim 2 together with a divider having three telescopic portions, each end portion having a downwardly facing hook thereon for engaging over opposite side walls for dividing the area enclosed by the side walls for dividing the cake into a plurality of pieces having a predetermined size for forming a layer cake from the pieces.

4. A cake frame comprising a plurality of walls defining an open enclosure for disposition on a flat surface and retaining cake dough during the baking thereof, each of said walls including three members of substantially equal length, the intermediate member of each wall being tubular and telescopically receiving the major portion of the end members, and means detachably interconnecting adjacent walls, said detachably interconnecting means including a tab on the outer end of an end member of one wall, a hinge connection mounting the tab thereon whereby the tab may be folded alongside said one wall, the outer end of an end member of an adjacent wall having an outwardly facing longitudinal socket therein for telescopically and frictionally receiving said tab whereby the walls may be disassembled.

References Cited in the file of this patent

UNITED STATES PATENTS

| | | |
|---|---|---|
| 899,292 | Carter | Sept. 22, 1908 |
| 1,212,948 | Hesse | Jan. 16, 1917 |
| 1,971,903 | Cohen | Aug. 28, 1934 |
| 2,475,961 | Hilbert | July 17, 1949 |
| 2,591,786 | Cronheim | Apr. 8, 1952 |

FOREIGN PATENTS

| | | |
|---|---|---|
| 463,130 | Canada | Feb. 14, 1950 |